(12) United States Patent
Lichtsinn et al.

(10) Patent No.: US 8,549,113 B2
(45) Date of Patent: Oct. 1, 2013

(54) TRANSACTIONAL INDEPENDENT PERSISTER CLONING SYSTEM

(75) Inventors: Mario H Lichtsinn, San Jose, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 13/015,282

(22) Filed: Jan. 27, 2011

(65) Prior Publication Data

US 2012/0198028 A1    Aug. 2, 2012

(51) Int. Cl.
*G06F 15/16*    (2006.01)
(52) U.S. Cl.
USPC ......................................... 709/219; 709/217
(58) Field of Classification Search
USPC ........................................................ 709/219
See application file for complete search history.

(56) References Cited

U.S. PATENT DOCUMENTS

| | | | |
|---|---|---|---|
| 5,758,118 A | 5/1998 | Choy et al. | |
| 5,991,804 A | 11/1999 | Bolosky et al. | |
| 6,035,374 A | 3/2000 | Panwar et al. | |
| 6,304,941 B1 | 10/2001 | Lyons et al. | |
| 6,347,359 B1 | 2/2002 | Smith et al. | |
| 6,901,479 B2 | 5/2005 | Tomita | |
| 7,111,117 B2 | 9/2006 | Franklin et al. | |
| 7,490,207 B2 | 2/2009 | Amarendran et al. | |
| 7,548,898 B1 | 6/2009 | Tarenskeen et al. | |
| 7,685,129 B1 | 3/2010 | LeCrone et al. | |
| 2003/0145167 A1 | 7/2003 | Tomita | |
| 2004/0205166 A1 | 10/2004 | DeMoney | |
| 2006/0075290 A1 | 4/2006 | Hartline et al. | |
| 2006/0107097 A1 | 5/2006 | Zohar et al. | |
| 2007/0050620 A1* | 3/2007 | Pham et al. | 713/165 |
| 2008/0080526 A1 | 4/2008 | Gounares et al. | |
| 2008/0082693 A1 | 4/2008 | Meijer et al. | |
| 2008/0147632 A1* | 6/2008 | Couch et al. | 707/5 |
| 2008/0222375 A1* | 9/2008 | Kotsovinos et al. | 711/162 |
| 2008/0276041 A1 | 11/2008 | Hetzler | |
| 2008/0276057 A1 | 11/2008 | Hetzler | |
| 2009/0089781 A1 | 4/2009 | Shingai et al. | |

(Continued)

OTHER PUBLICATIONS

Bellavista et al. "Proactive Management of Distributed Buffers for Streaming Continuity in Wired:Wireless Integrated Networks" Network Operations and Management Symposium, 2006, 10th IEEE/IFIP, (Apr. 2006), pp. 351-360.

(Continued)

*Primary Examiner* — Krista Zele
*Assistant Examiner* — Esther Benoit
(74) *Attorney, Agent, or Firm* — Jeffrey T. Holman

(57) ABSTRACT

A computer program product, including a computer readable storage medium to store a computer readable program, wherein the computer readable program, when executed by a processor within a computer, causes the computer to perform operations for moving data stored on a transactional semantic independent persister in a distributed environment. The operations include: receiving an indicator to move data stored by the persister at a first node of the distributed environment to a second node of the distributed environment, wherein the data corresponds to a source; and cloning the persister at the first node to a cloned persister at the second node in response to receiving the indicator, wherein the cloning includes: moving data stored by the persister at the first node to the cloned persister; and moving remaining data in a data stream between the source and the persister at the first node to the cloned persister.

18 Claims, 13 Drawing Sheets

(56) References Cited

U.S. PATENT DOCUMENTS

| | | | |
|---|---|---|---|
| 2009/0106267 A1* | 4/2009 | Bumgarner et al. | 707/10 |
| 2009/0171999 A1 | 7/2009 | McColl et al. | |
| 2009/0265567 A1 | 10/2009 | Nguyen et al. | |
| 2009/0265706 A1 | 10/2009 | Golosovker et al. | |
| 2009/0276771 A1 | 11/2009 | Nickolov et al. | |
| 2010/0011192 A1 | 1/2010 | Boyer et al. | |
| 2010/0169287 A1 | 7/2010 | Klose | |

OTHER PUBLICATIONS

Bradford et al. "Live Wide-Area Migration of Virtual Machines Including Local Persistent State" Proceedings of the 3rd International Conference on Virtual Execution Environments, (Jun. 2007), p. 169-179.

Greiner et al. "Generic Hardware / Software Communication Middleware for Streaming Applications on Shared Memory Multi Processor Systems-on-Chip" Forum on Specification & Design Languages, 2009, (Sep. 2009), 4 pages.

Hirofuchi et al. "A Live Storage Migration Mechanism over WAN for Relocatable Virtual Machine Services on Clouds" Proceedings of the 2009 9th IEEE/ACM International Symposium on Cluster Computing and the Grid, (May 2009), pp. 460-465.

Hu et al. "On Media Streaming Application Migration in Pervasive Environment" Proceedings of the First Asia Pacific Symposium on Internetware, (Oct. 2009), 1 page.

Ramakrishnan et al. "Live Data Center Migration acrossWANs: A Robust Cooperative Context Aware Approach" Proceedings of the 2007 SIGCOMM Workshop on Internet Network Management, (Aug. 2007), 6 pages.

Rudolph et al. "A Simple Load Balancing Scheme for Task Allocation in Parallel Machines" Proceedings of the Third Annual ACM Symposium on Parallel Algorithms and Architectures, (1991), pp. 237-245.

Sapuntzakis et al. "Optimizing the Migration of Virtual Computers" Proceedings of the 5th Symposium on Operating Systems Design and Implementation, vol. 36, (2002), pp. 377-390.

Sobolewski et al. "Federated Grid Computing with Interactive Service-oriented Programming" International Journal of Concurrent Engineering: Research & Applications, vol. 14, No. 1, (Mar. 2006), 13 pages.

* cited by examiner

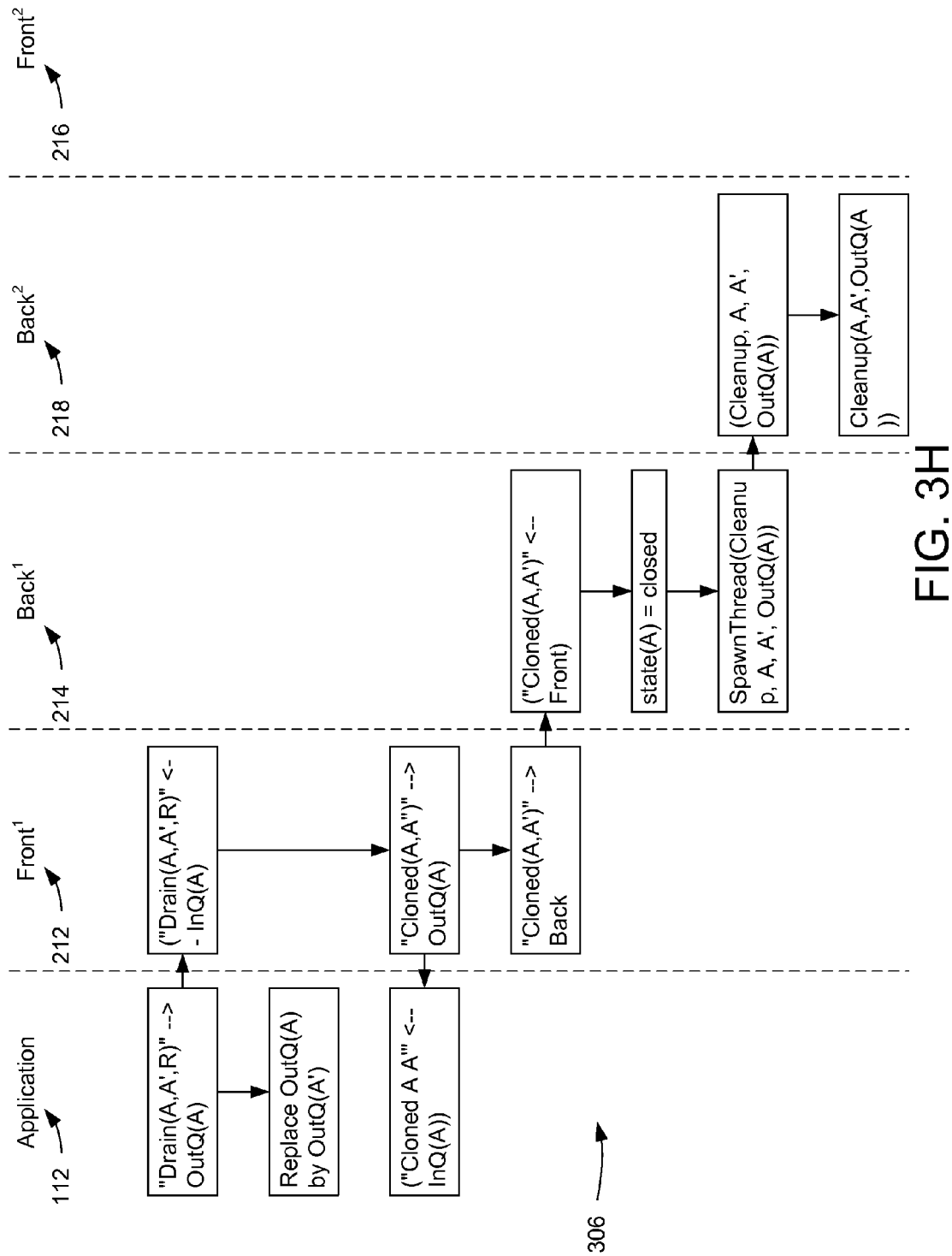

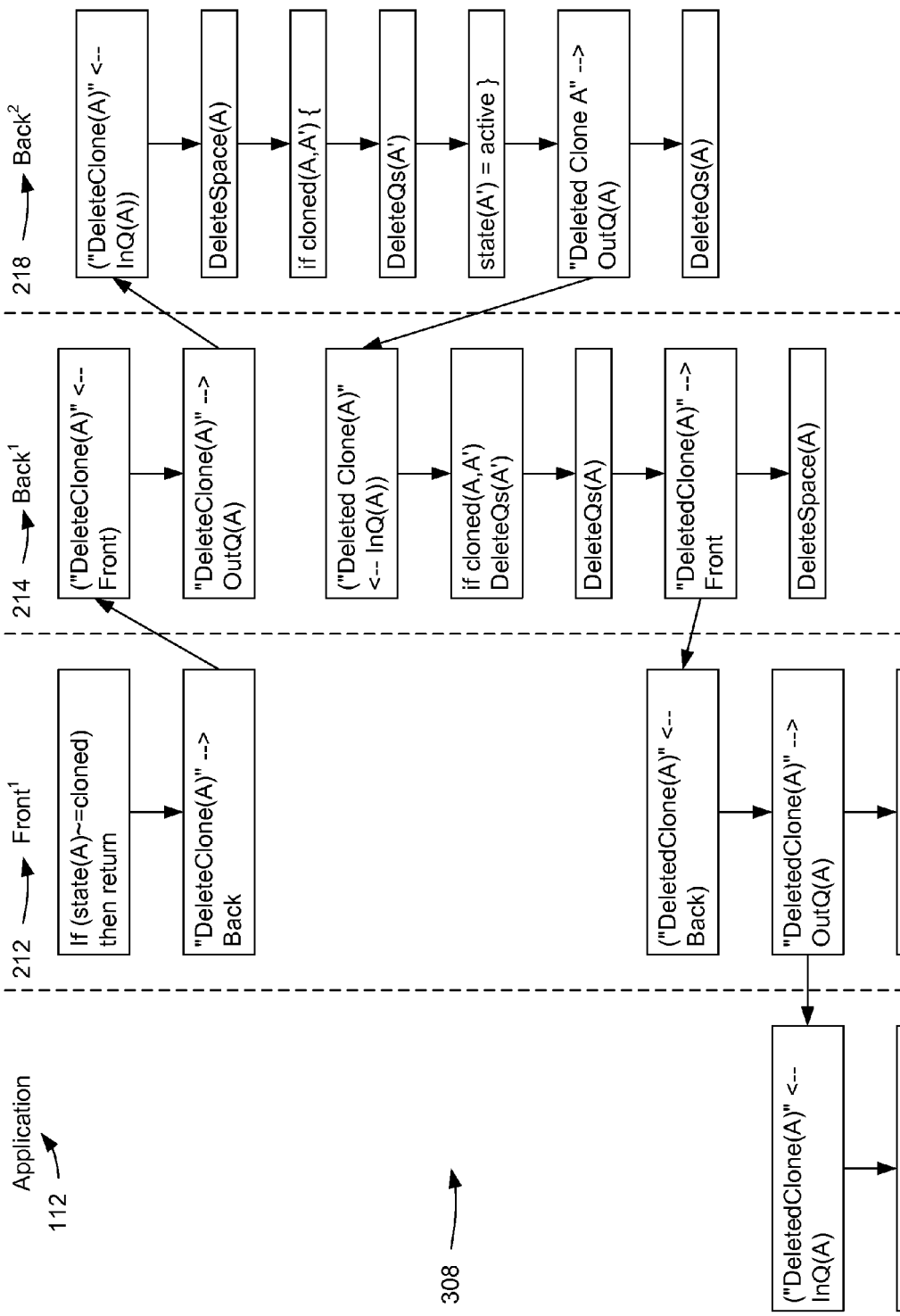

TRANSACTIONAL INDEPENDENT PERSISTER CLONING SYSTEM

CROSS-REFERENCE TO RELATED APPLICATIONS

This application is related to the application with Ser. No. 13/015,015, entitled "Wait-Free Stream Oriented Migration Based Storage" that is to be filed on the same day as the present application. This application is also related to U.S. application Ser. No. 11/743,081, filed on May 1, 2007, and entitled "Data Storage Array Scaling Method and System with Minimal Data Movement" which is now abandoned, and pending U.S. application Ser. No. 12/134,051, filed on Jun. 5, 2008, and entitled "Data Storage Array Scaling Method and System with Minimal Data Movement."

BACKGROUND

Data persistence is generally a core component of software applications and many persistence mechanisms are available for persisting the data. Software architects may make a decision for a persistence mechanism based on the requirements of the to-be-developed software application. Due to the nature of supported operating environments such as processing financial or scientific data, certain types of applications deal with highly interconnected data which results in larger amounts of dynamic update operations. Since many applications demand very fast response times, software architects often want to keep this frequently updated data in main memory and only persist data changes to disk when requested. Because those save operations—triggered by users or by the application itself—usually mean an interruption of the work flow, a quick and reliable execution is required.

Cloud computing is one of the latest trends in the computer industry. A key characteristic of this new style of computing is the ability to move services around in a highly dynamic infrastructure very quickly, but still in a reliable and secure way. Existing application server technologies help with deploying and moving applications in the cloud, but they offer little help when it comes to moving application data. Most systems rely on central, dedicated database servers that would not move like the application code does. Applications that deal with highly interconnected data perform poorly in these environments due to the large amount of I/O operations and network traffic needed by such an approach. For performance and security reasons, it is desirable to keep the application data close to the application.

SUMMARY

Embodiments of a system are described. In one embodiment, the system is a transactional independent persister cloning system. The system includes: a self-cloning data persister on a first node of a distributed environment; and a receiver to receive an indicator to move data stored on the data persister to a second node of the distributed environment, wherein the data corresponds to a source, wherein the self-cloning data persister is configured to self-clone to a cloned persister at the second node in response to the receiver receiving the indicator, wherein the self-cloning data persister is further configured to clone the data by: moving data stored on the self-cloning data persister at the first node to the cloned persister; and moving remaining data in a data stream between the source and the self-cloning data persister at the first node to the cloned persister. Other embodiments of the system are also described.

Embodiments of a computer program product are also described. In one embodiment, the computer program product includes a computer readable storage medium to store a computer readable program, wherein the computer readable program, when executed by a processor within a computer, causes the computer to perform operations for moving data stored on a persister in a distributed environment. The operations include: receiving an indicator to move data stored by the persister at a first node of the distributed environment to a second node of the distributed environment, wherein the data corresponds to a source; and cloning the persister at the first node to a cloned persister at the second node in response to receiving the indicator, wherein the cloning includes: moving data stored by the persister at the first node to the cloned persister; and moving remaining data in a data stream between the source and the persister at the first node to the cloned persister. Other embodiments of the computer program product are also described.

Embodiments of a method are also described. In one embodiment, the method is a method for moving data stored on a persister in a distributed environment. The method includes: receiving an indicator to move data stored by the persister at a first node of the distributed environment to a second node of the distributed environment, wherein the data corresponds to a source; and cloning the persister at the first node to a cloned persister at the second node in response to receiving the indicator, wherein the cloning includes: moving data stored by the persister at the first node to the cloned persister; and moving remaining data in a data stream between the source and the persister at the first node to the cloned persister. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 3A-3K depict a flow chart diagram of one embodiment of a method for cloning a persister in the system of FIG. 1.

Throughout the description, similar reference numbers may be used to identify similar elements.

DETAILED DESCRIPTION

Figure 1:
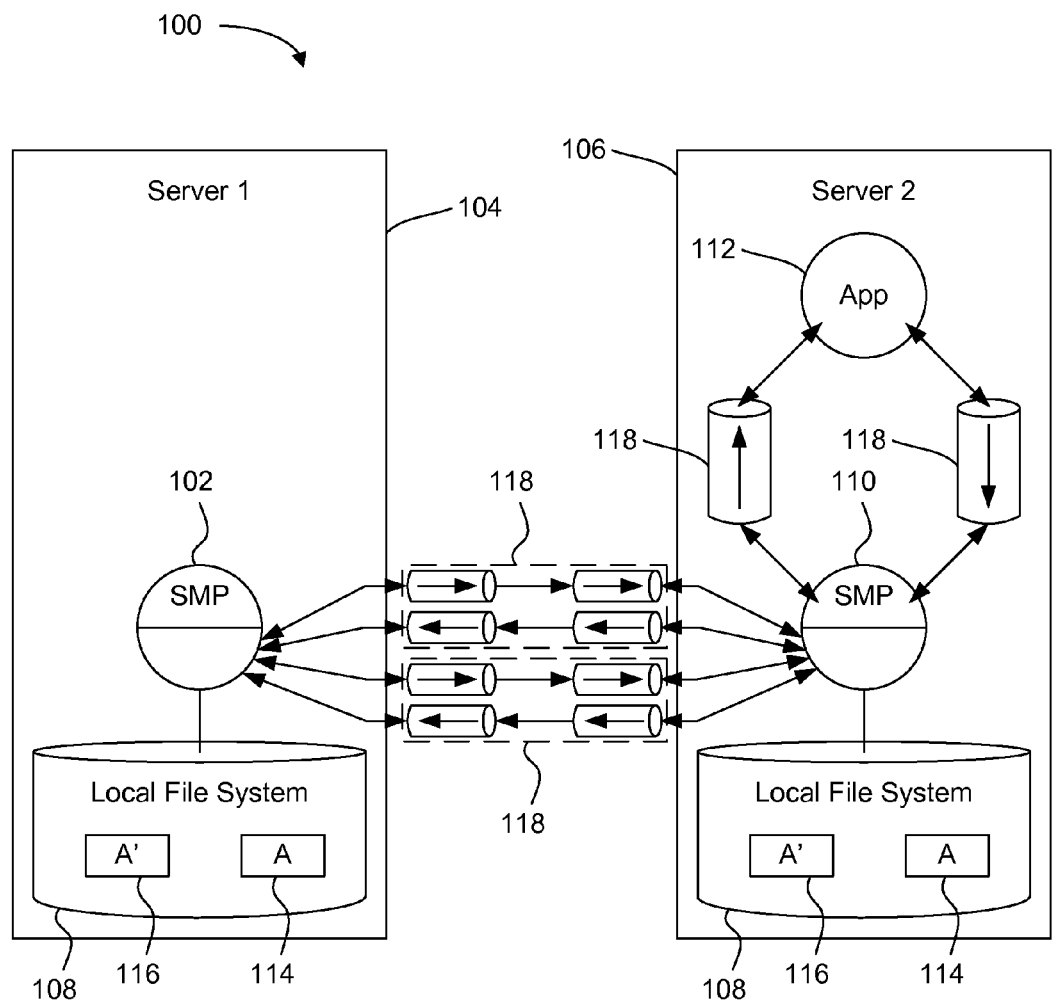
FIG. 1 depicts a schematic diagram of one embodiment of a persister cloning system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for moving or cloning a transactional independent persister in a distributed environment. More specifically, the system provides for cloning a persister and its data from one node in a distributed environment to another node in the distributed environment. In some embodiments, the persister may be cloned multiple times onto several different nodes. The cloning process may occur after the system detects that a source for the data being persisted by the persister has moved in the distributed environment. Because the cloning process occurs independently of the movement of the application, there may be little or no interruption in application processes either during the cloning process or when the application saves data to the persister.

Some applications, such as financial or scientific applications, often choose stream processing as the core processing paradigm because of its advantages for data that is computation intensive and written once. For those applications, it may be very beneficial to also use a stream-based approach for persisting and moving data in a cloud environment. Since the Java Database Connectivity (JDBC) and the Open Database Connectivity (ODBC) APIs are the most popular standard persistence APIs, the described apparatus provides a JDBC and ODBC conforming interface as part of a loadable driver on top of the stream-based persistence and moving data mechanism.

One common conventional approach is the use of a central, dedicated database server which runs a standardized database management system (DBMS) as a persister to allow concurrent and efficient data access, data integrity, etc. One of the key features that made relational databases so successful is the introduction of standard, vendor-independent APIs and query languages, like ODBC, JDBC, and the SQL standard. While conventional databases may provide many functions, there may be circumstances when a light-weight solution that still provides the essential functionalities of a persister may be used, which may improve application operation speed.

General requirements on a persister include:
1. an application interface that allows a save call to the persister containing data,
2. a return from the save call that guarantees the data is persistent and provides a corresponding data locator (information for retrieving the persistent data from its storage location),
3. an application interface that allows a retrieve call to the persister containing a locator,
4. a return from the retrieve call that contains the data corresponding to the locator,
5. an application interface that allows a delete call to the persister containing a locator, and a parameter specifying immediate or eventual deletion, and
6. a return from the delete call that guarantees the deletion of the data and the (immediate or eventual) invalidation of the locator.

The usual bias in persister performance is toward fast saves at the expense of the other operations. Another feature that may be desirable in persisters is the security of the data. For this reason, encryption is often a part of the save operation (with decryption provided for the retrieve operation).

The system and method described herein provide for persisting and moving application state in a cloud computing or other distributed environment which may include some of the following mechanisms:

chaining stream processors, like compression and encryption, for persisting data directly to local storage media or remote processes or threads;

generating a single archive file with a well-defined format as compressed and encrypted storage media for persisting stream data;

converting SQL operations directly to stream operations, minimizing memory usage and providing very fast execution times;

providing a light-weight driver with JDBC and ODBC conforming call-level APIs for standard SQL-based access to stream-processing based persistence;

self-moving the driver and data to follow moving applications from one server of the cloud to another;

providing a self-moving data cache by moving the data from a dedicated, central database server in the cloud closer or onto the same server as the connection application; and moving persistent data from one device to another without pausing or interrupting any application operations that append or read the data.

FIG. 1 depicts a schematic diagram of one embodiment of a persister cloning system 100. In one embodiment, the system 100 includes a persister 102 and a cloned persister 110 on multiple nodes 104, 106 or servers on a distributed network. The servers may store data on a local file system 108 at each node 104, 106. The persister 102 may be in communication with one or more applications 112 through any type of data connection, such as a data stream 118. One or more persistent data files 114, 116 may be stored on the local file systems 108 at each node 104, 106. Each persistent data file 114, 116 includes data corresponding to the application 112 that the application 112 sends to the persister 102 or cloned persister 110. The persister 102 is also referred to herein as a self-moving persister (SMP) or a self-cloning persister.

In one embodiment, the persister 102 includes a chain of stream processing operators (like those of U.S. Pat. App. No. US2010011192, herein incorporated by reference). After an application 112 connects with the persister 102, the application 112 may receive a locator for its persistent data file 114 indicating a position of the persister 102 and persistent data file 114 in the distributed network. All further JDBC commands from the application 112 may be entered into an input stream 118—which may be a first-in first-out (FIFO) cache—for the persister 102. All returns and retrieved data may be placed by the persister 102 in an output stream 118 for the application 112. The connections between the application 112 and the persister 102 may be data streams 118 that include stream processing operators that may modify or process data in mid-stream.

In one embodiment, the application 112 is moved from a first node 104 to a second node 106. This may happen through many scenarios including recovery scenarios in which the application 112 is recovered on a different server from the original server and connects to a clone of its original persistent storage (established for remote recovery), or in a cloud computing environment when the device on which the application 112 is stored connects to a different server in different sessions, or other scenarios.

The persister 102 may include a front end and a back end. The front end may communicate with the back end and with the application 112, while the back end may communicate with the front end and a back end of the cloned persister 110. In this embodiment, the front end and the back end may perform different steps in the cloning process to allow the persister 102 to effectively interact with the application 112 and cloned persister 110 simultaneously without interrupting the cloning process.

When the persister 102 detects that the application 112 has moved to another server, the persister 102 automatically initiates a process by which it first clones itself to a cloned persister 110 on the second node 106 and then (if desired) removes itself from the first node 104 after terminating a connection with the application 112. In some embodiments, the persister 102 does not remove itself entirely, but instead removes its association with persistent data corresponding to a locator for the specific application 112 because the persister 102 may have connections to other client applications 112. The cloning process includes establishing data stream channels 118 between the persister 102 and the cloned persister 110, such that the persistent data file 114 is cloned on the second node 106 to match the persistent data file 114 on the first node 104 and the persistent data file 116 is cloned on the first node 104 to match the persistent data file 116 on the second node 106. Each node may include multiple persistent data files 114, 116 to account for data flowing into both persisters 102, 110 while the application 112 switches over from flowing data into the persister 102 to flowing data into the cloned persister 110. When all data flowing into the persister 102 has been processed and forwarded to the cloned persister 100, the persistent data files 114, 116 on the first node 104 become redundant and may be removed. In some embodiments, the two persisters may be maintained as clones indefinitely, such that the cloned persister 110 continues to flow data to the persister 102.

Figure 2:
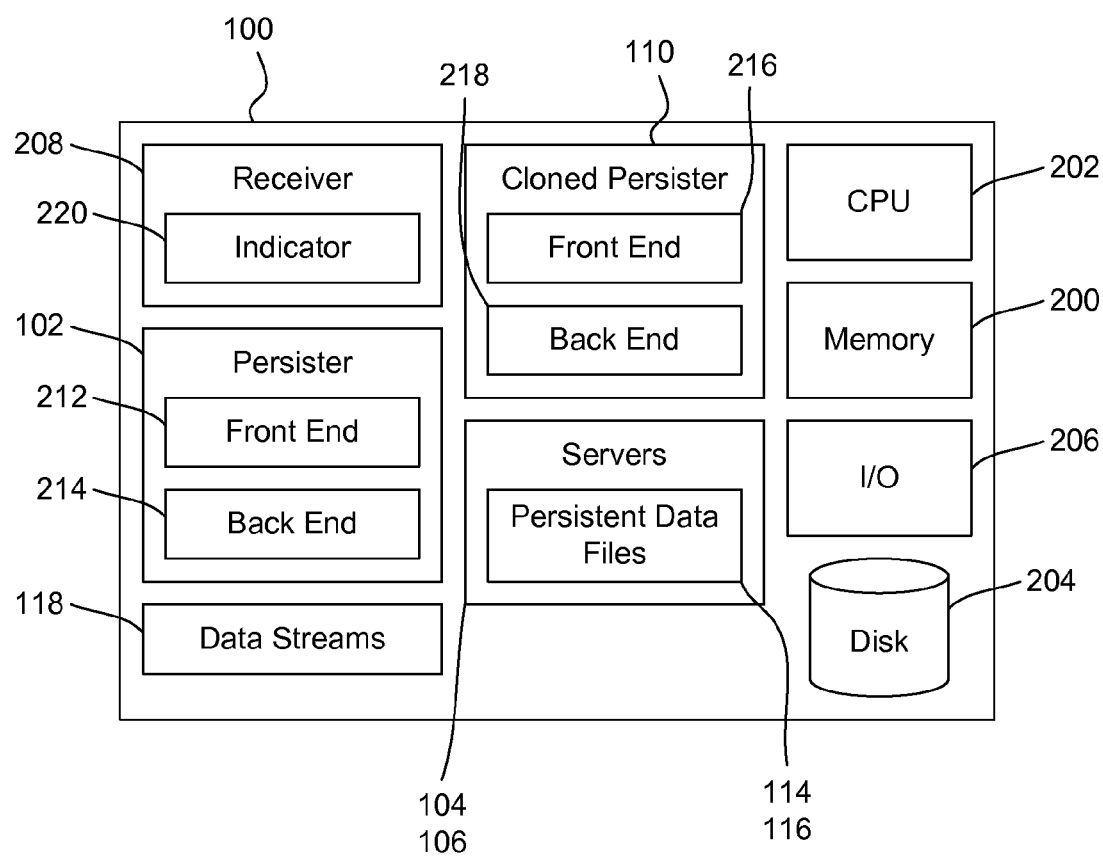
FIG. 2 depicts a schematic diagram of one embodiment of the persister cloning system of FIG. 1.

FIG. 2 depicts a schematic diagram of one embodiment of the persister cloning system 100 of FIG. 1. The depicted persister cloning system 100 includes various components, described in more detail below, that are capable of performing the functions and operations described herein. In one embodiment, at least some of the components of the persister cloning system 100 are implemented in a computer system. For example, the functionality of one or more components of the persister cloning system 100 may be implemented by computer program instructions stored on a computer memory device 200 and executed by a processing device 202 such as a CPU. The persister cloning system 100 may include other components, such as a disk storage drive 204, input/output devices 206, a receiver 208, a self cloning data persister 102, a cloned persister 110, and servers or nodes 104, 106. Some or all of the components of the persister cloning system 100 may be stored on a single computing device or on a network of computing devices. The persister cloning system 100 may include more or fewer components than those depicted herein. In some embodiments, the persister cloning system 100 may be used to implement the methods described herein as depicted in FIGS. 3A-3K.

The persister 102 is a data persister that persists data on a local file system 108 at a first node 104 within a distributed environment. For example, the persister 102 may be part of a cloud computing environment where data for an application 112 may be stored or accessed on multiple computing devices. In one embodiment, the persister 102 includes a front end 212 and a back end 214. The front end 212 may communicate with an application 112 and with the back end 214 of the persister 102, and the back end 214 may communicate with the front end 212 of the persister 102 and a back end 218 of a cloned persister 110. This configuration may allow the front end 212 and back end 214 to perform processes concurrently without conflicting with the other. Other embodiments of the persister 102 may be used with the system 100.

The receiver 208 identifies or receives an indicator 220 for the system 100 to move or clone data stored in a data file 114 corresponding to the persister 102 on one node 104 within a distributed environment to another node 106. The indicator 220 may indicate to the system 100 that the application 112 has moved from one location in the distributed environment to another. If the application 112 moves, the system 100 may move the data file 114 to the location where the application 112 has moved so as to reduce processing times and latency in communication between the application 112 and the persistent data file 114. While the embodiments described herein present scenarios in which the application 112 is moved to a different node, there may be other information included in the indicator 220 for implementing the system 100 described.

Servers may be located at each node 104, 106 in the distributed environment. Each node 104, 106 may be a separate physical location in the distributed environment, or each node 104, 106 may be a separate logical location. A node 104, 106 may include one or more servers to store data relating to one or more applications 112. In some embodiments, a single server holds data corresponding to many different applications 112 for many different users. The server stores the data corresponding to a given application 112 in a persistent data file 114. Because each persistent data file 114 may correspond to a single application 112 or user, a server may include many different persistent data files that are uniquely identified.

The self cloning data persister 102 is configured to self-clone from the first node 104 onto a second node 106 as a cloned persister 110 in response to the determination by the receiver 208 that the persister 102 should be cloned. In addition to self-cloning, the self-cloning data persister 102 may also clone the persistent data file 114 for a given application 112 in response to the relocation of the application 112 within the distributed environment. During the cloning process, each server involved in the process may have more than one copy of each persistent data file 114, 116, or more than one persistent data file 114, 116 corresponding to data flowing into each of the persister 102 and the cloned persister 110, in order to preserve a data transmission order from the application 112 to the persister 102 and cloned persister 110 and/or to prevent corruption in the data. In addition to moving the data stored in the persistent data file 114, the self-cloning data persister 102 also moves any remaining data from a data stream 118 into the persister 102 from the source application 112. This may ensure that all data from the application 112 is accurately cloned to the second node 106.

In some embodiments, the self-cloning data persister 102 may be further configured to compress and encrypt the data before moving the data to the cloned persister 110. After self-cloning and cloning the data, the self-cloning data persister 102 may then remove the data stream 118 between the persister 102 and the application 112 and terminate a connection between the source and the persister 102, such that the locator indicating a location of the persister 102 and persistent data files 114, 116 on the first node 104 is no longer available to the application 112. This may occur at any time convenient for the application 112 so as not to interrupt application operation.

FIGS. 3A-3K depict a flow chart diagram of one embodiment of a method for cloning a persister 102 in the system 100 of FIG. 1. Although the method is described in conjunction with the persister cloning system 100 of FIG. 1, embodiments of the method may be implemented with other types of persister cloning systems 100.

Figure 3A:
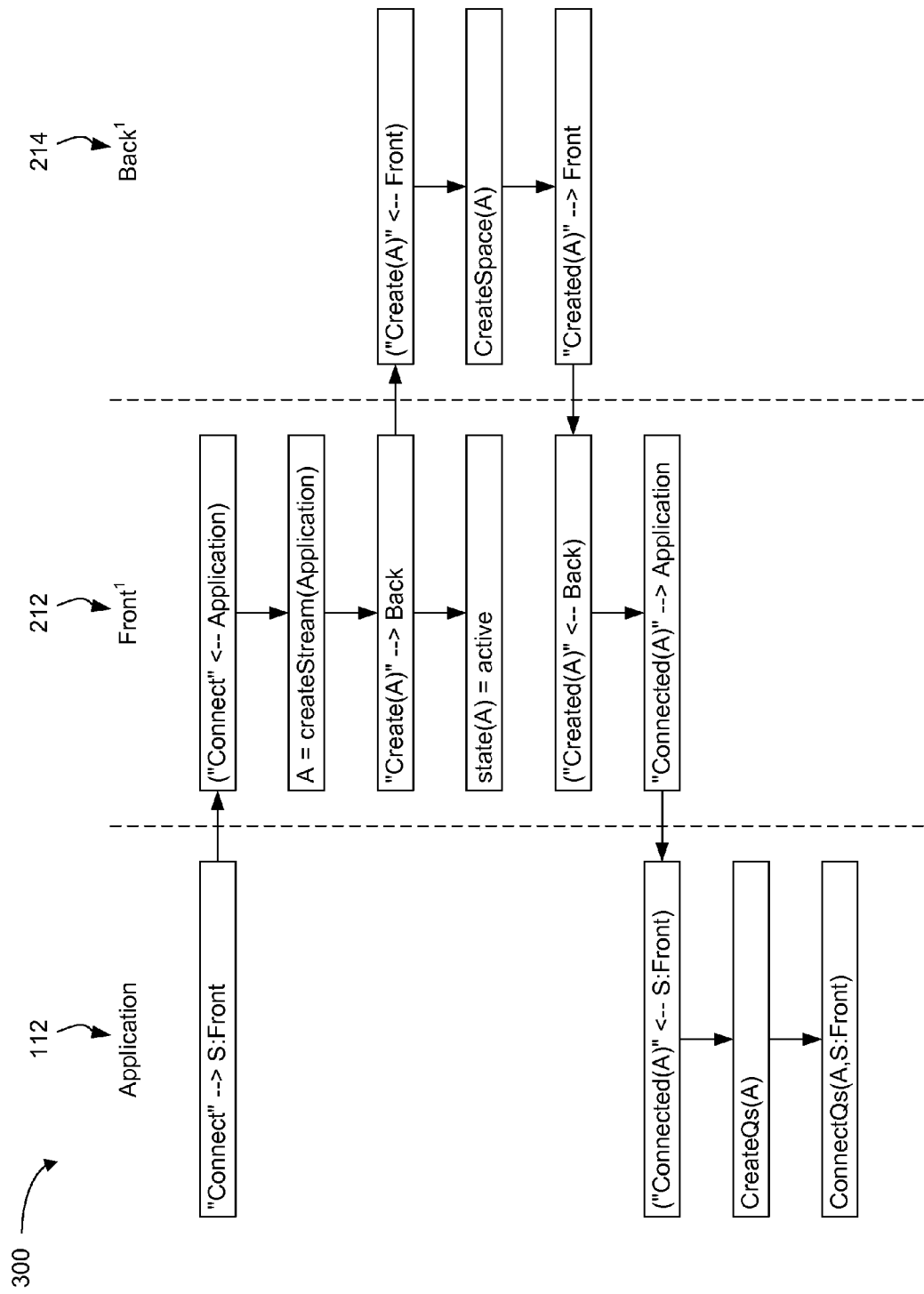

FIG. 3A illustrates a flow chart 300 for creating a stream 118 between the persister 102 and the application 112. The application 112 attempts to establish a connection with the front end of the persister 102. The front end 212 of the persister 102 communicates with the back end 214 of the persister 102 to create a space for streamed data to be stored. The space where the data is to be stored is the persistent data file 114. When the persister 102 has created the persistent data file 114 on the server, the application 112 may then create the streams 118 over which the data is to be transferred. The application 112 may establish one or more streams 118 for data being transferred in each direction between the application 112 and the persister 102.

Figure 3B:
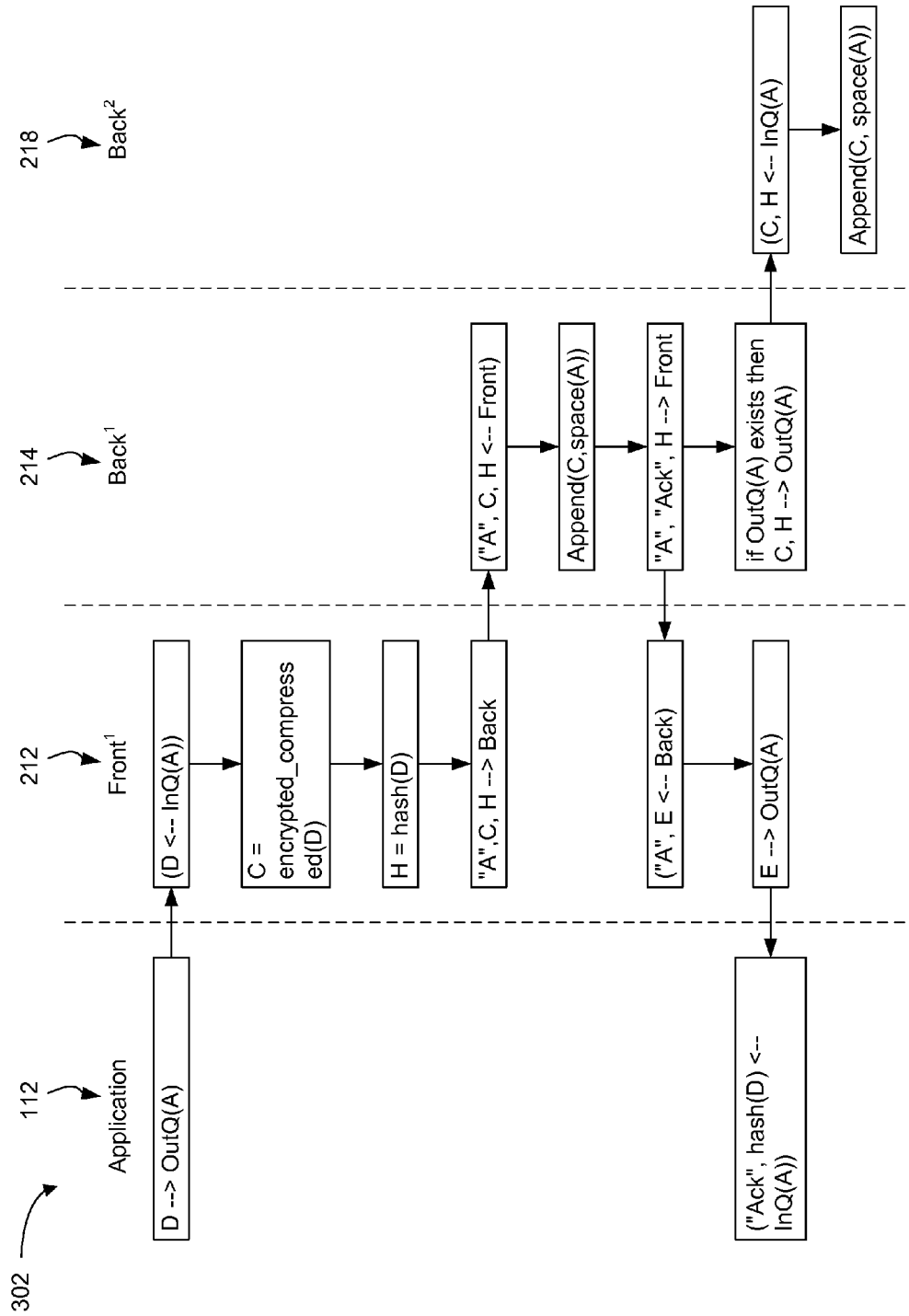

FIG. 3B illustrates a flow chart 302 for persisting a chunk of data for a given stream 118 in the persistent data file 114 at the node server. The application 112 places the data chunk on its out stream 118 on the data stream 118 for the front end 212 of the persister 102, and the front end 212 receives the data chunk on the persister's incoming data stream 118. The front end 212 may compress and encrypt the data and may also compute a hash value for identifying the data chunk before sending the modified data chunk with the hash value to the back end 214 of the persister 102. The data chunk is appended to the corresponding persistent data file 114, and the persister 102 may send an acknowledgement to the application 112 to notify the application 112 that the data was successfully persisted.

In one embodiment, if the cloning process has already begun to clone the persister 102 and persistent data file 114 on a second node 106, the back end 214 of the persister 102 may place the chunk into a data stream 118 for the back end 218 of the cloned persister 110. The cloned persister 110 may append the data chunk to the corresponding persistent data file 114 on the second node 106. This may occur at any time after the back end 214 of the persister 102 on the first node 104 receives the data chunk from the front end 212. After the application 112 switches the data stream to the cloned persister 110, the front end 216 of the cloned persister 110 sends the next data chunk to the back end 218 where the data chunk is appended to the persistent data file 116 of the second node 106. In one embodiment, the data chunk is also sent to the back end 214 of the first node 104 to be appended to the persistent data file 114. Consequently, on each node 104, 106, all the data chunks in the persistent data file 114 of the first node 104 precede all the data chunks in the persistent data file 116 of the second node 106.

Figure 3C:
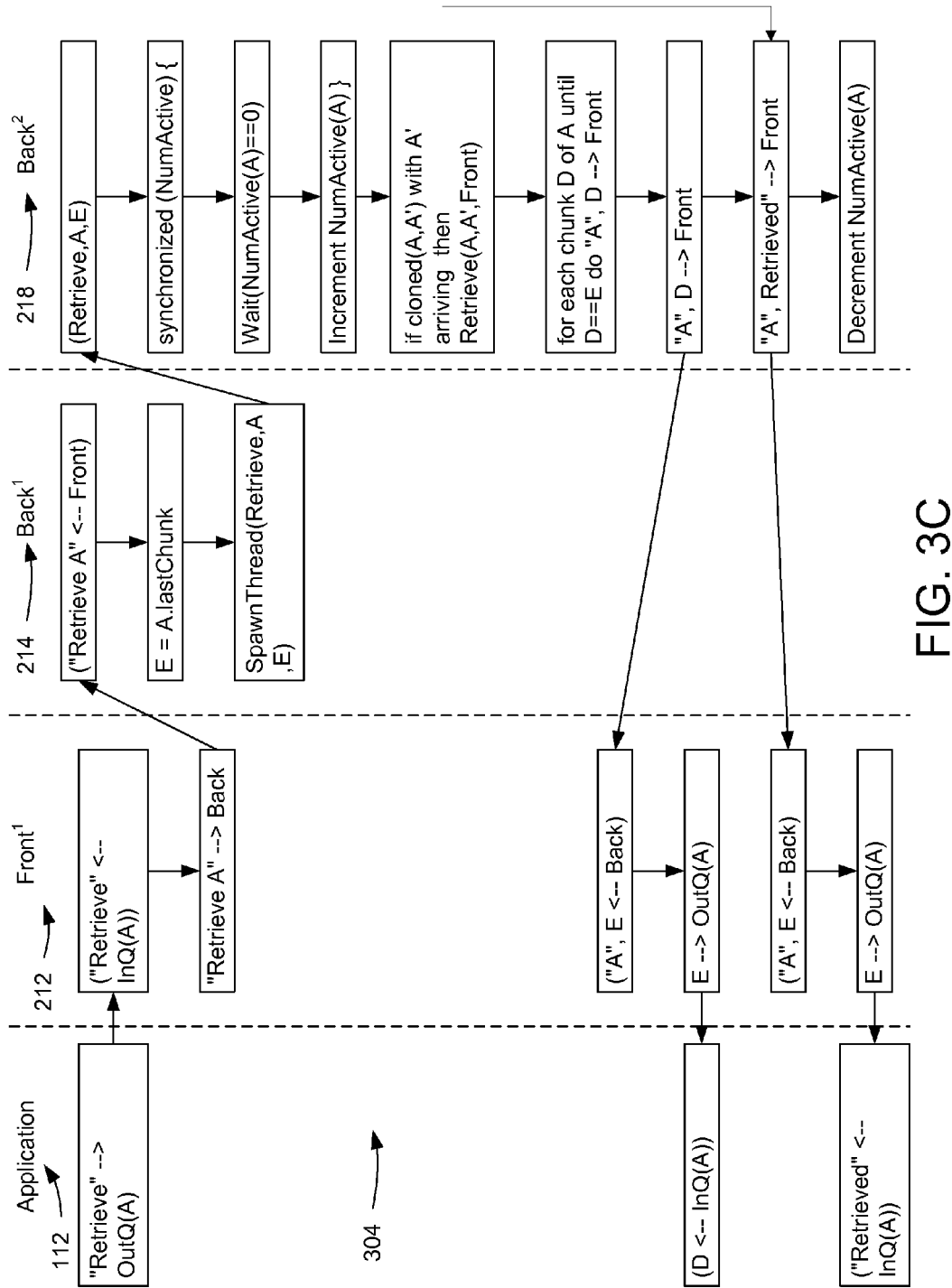
Figure 3D:
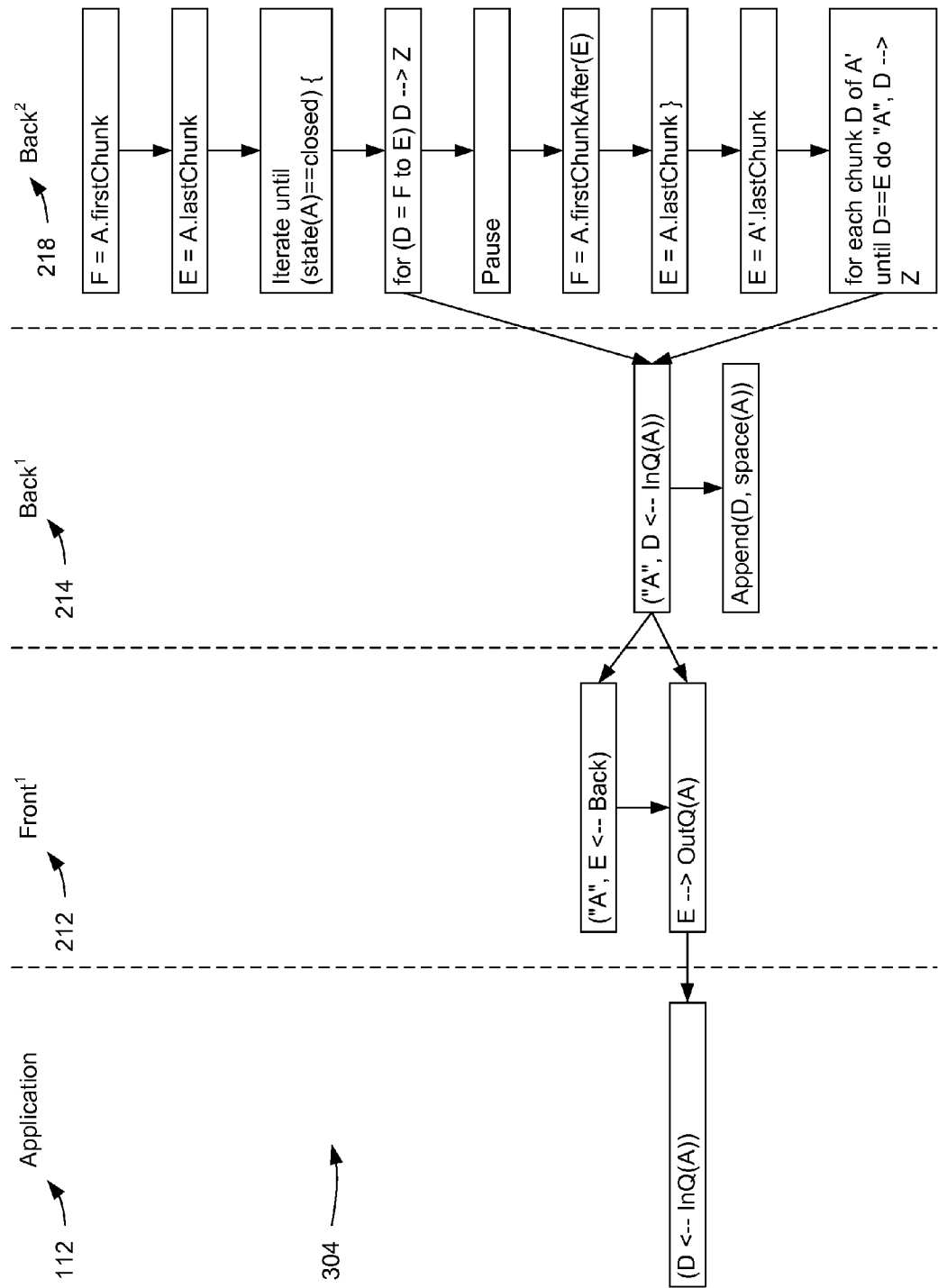
Figure 3E:
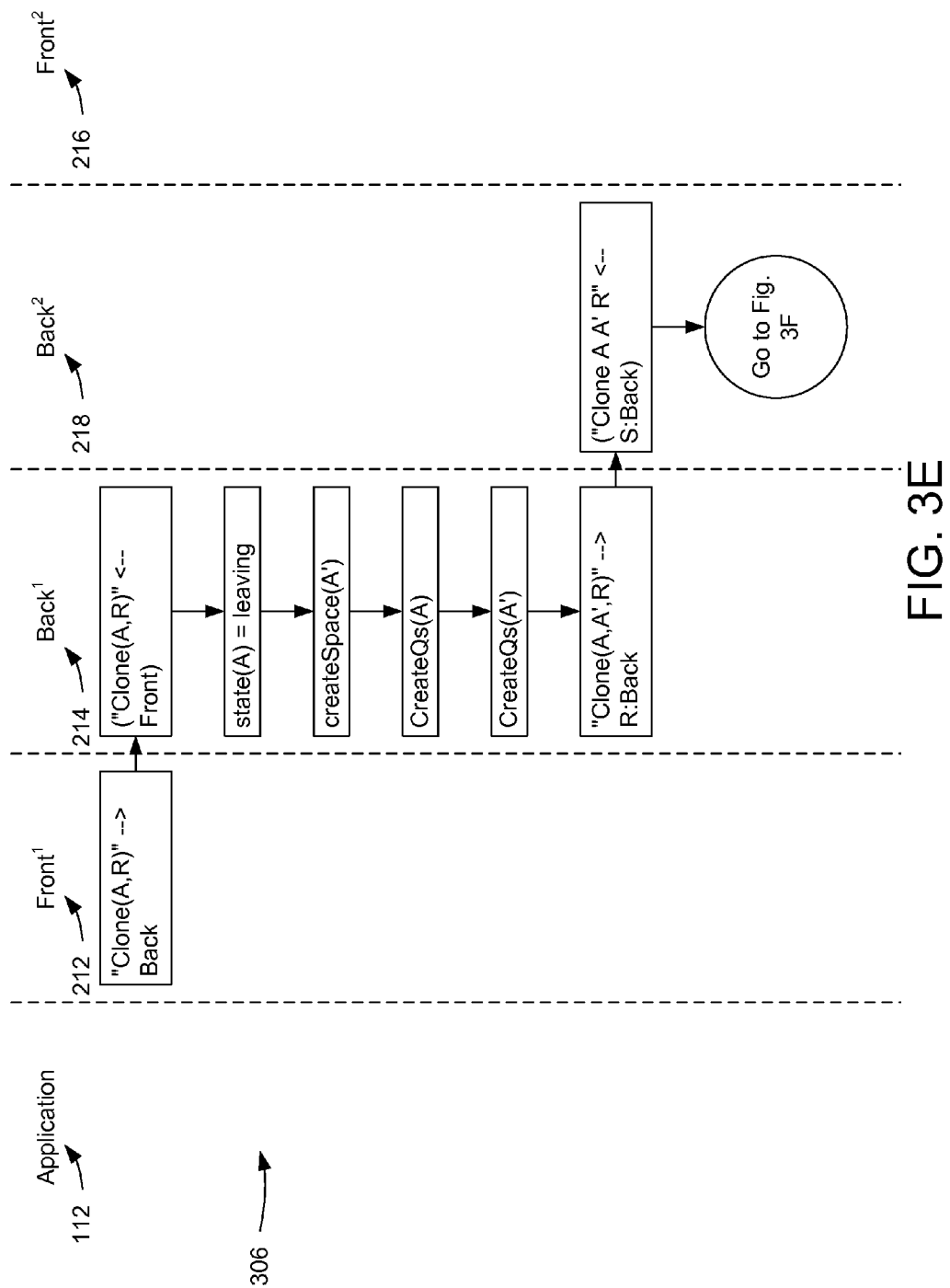
Figure 3F:
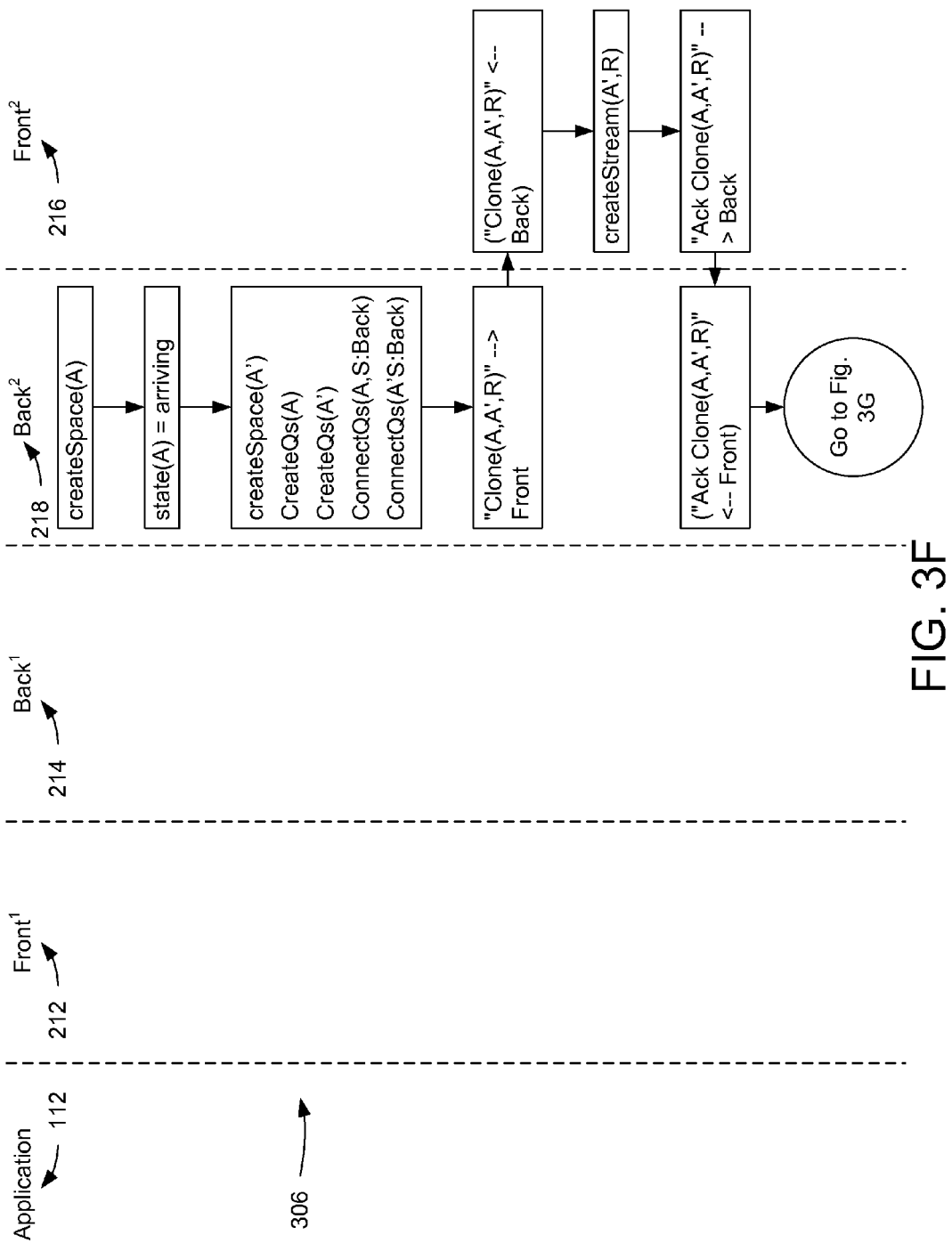
Figure 3G:
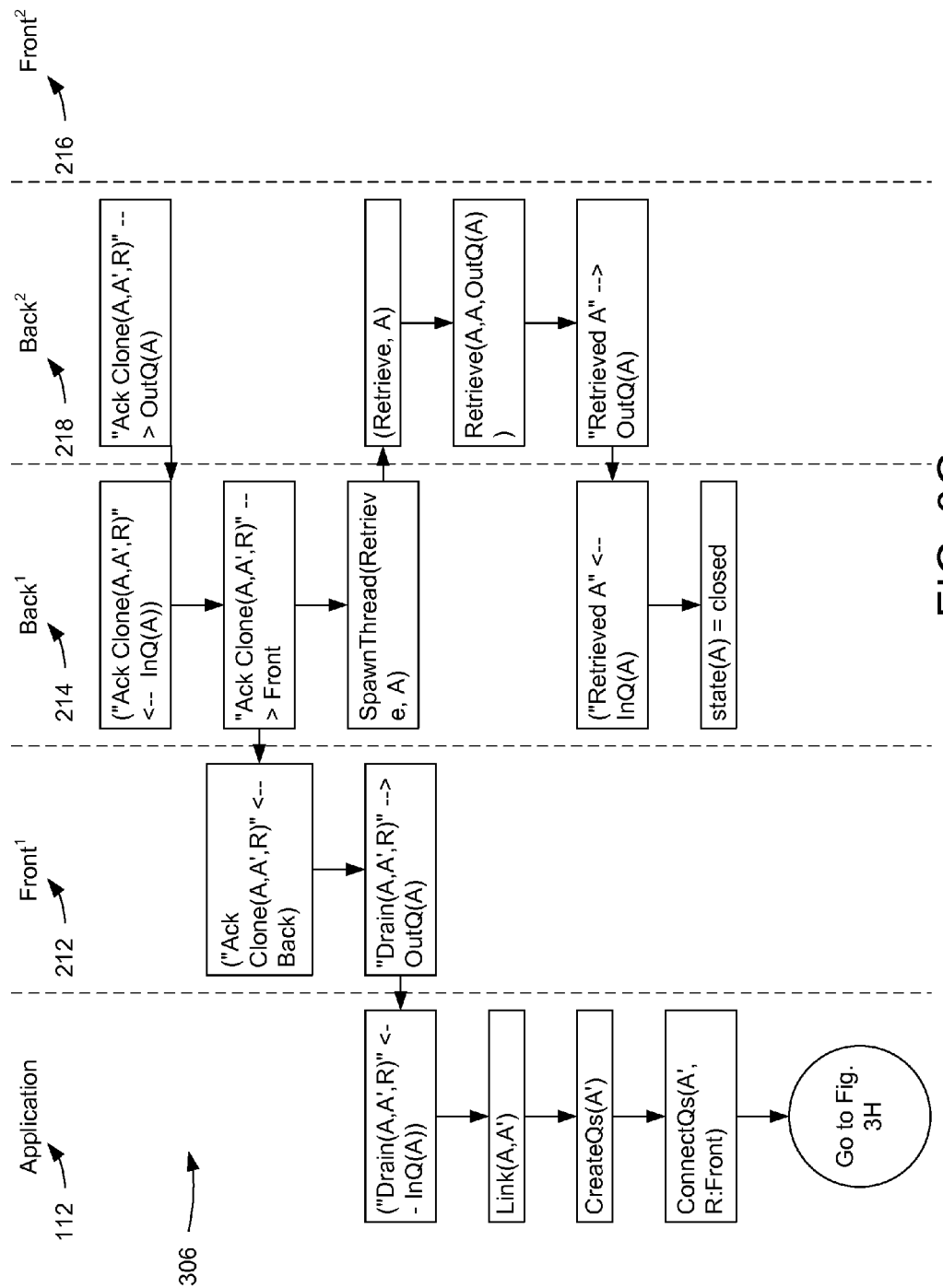

FIGS. 3C and 3D illustrate flow charts 304 for retrieving data from any of the persistent data files 114, 116. FIG. 3D illustrates a general retrieval routine with three parameters: a first persistent data file, a second persistent data file, and a location to which retrieved data is to be sent, labeled A,A', and Z, respectively. This routine may be used as shown in FIG. 3D where Z is the front end 212, and also in FIG. 3G where Z is labeled OutQ(A). The application 112 may contact the persister 102 to retrieve some or all of the data in the persistent data files 114, 116 from the node. If the application 112 retrieves data from the second node 106, the persister 110 may communicate with the persister 102 to make sure that the data retrieval is complete. The application 112 may retrieve data stored on either of the nodes 104, 106 while the application 112 is communicating with both of the nodes 104, 106. Retrieving data from one of the persistent data files 114, 116 may require data to be transferred between the persisters 102, 110 in some embodiments. In some embodiments, retrieving data from the persistent data files 114, 116 may wait for cloning, streaming, or other retrieval processes.

FIGS. 3E-3H illustrate flow charts 306 for creating a cloned persister 110 on a second node 106 from a persister 102 on a first node 104. When the persister 102 is ready to be cloned, the front end 212 of the persister 102 may send a signal to the back end 214, whereupon the back end 214 creates a second space or persistent data file 116 on the first node 104 to correlate with the persister 102 on the second node 106 where the persister 102 from the first node 104 is to be cloned. The cloned persister 110 also creates a space on the second node 106 corresponding to each persister 102, 110 on the first and second node 104, 106, such that both nodes 104, 106 contain a corresponding set of persistent data files 114, 116.

After the persistent data files 114, 116 have been created on each of the nodes, data streams 118 are established between each pair of persistent data files 114, 116 on the nodes, such that the corresponding persistent data files 114, 116 may transfer data in both directions between the back ends 214, 218 of the persister 102 and cloned persister 110. The cloned persister 110 may also establish a data stream 118 for the front end 216 to receive data from the application 112 and may notify the persister 102 on the first node 104 that the cloned persister 110 is ready to receive data from the application 112.

When the cloned persister 110 is ready to connect to the application 112, the persister 102 on the first node 104 may send a message to the application 112 so that the application 112 may begin streaming to the cloned persister 110. Because the cloning process may occur asynchronously with and independently of the movement of the application 112 from the first node 104 to the second node 106, the application 112 may switch over from the persister 102 to the cloned persister 110 at any time. When the application 112 is ready to switch, the application 112 may insert a drain message into the input data stream 118 for the persister 102 on the first node 104.

After sending the drain message, the application 112 may begin to stream data to the cloned persister 110. When the persister 102 receives the drain message, it stops receiving data from the application 112. In one embodiment, the persister 102 on the first node 104 may begin moving data from the persistent data file 114 for the persister on the first node 104 to the corresponding paired persistent data file 114 on the second node 106 before the drain message is sent. Likewise, the cloned persister 110 may move any data from the persistent data file 116 on the second node 106 for the cloned persister 110 to the corresponding paired persistent data file 116 on the first node 104.

Because the application 112 may begin transferring data to the cloned persister 110 on the second node 106 while the persister 102 on the first node 104 is still receiving data from the data stream 118 or has stored data that has not yet been transferred to the cloned persister 110, multiple persistent data files 114, 116 stored on each node corresponding to the data sent to the persister 102 and the cloned persister 110 are used to guarantee that both persisters 102, 110 can retrieve all data from the application 112 in the same order as it was originally sent. The persistent data files 114, 116 may be stored on each server until all data on the persister 102 and the data stream 118 to the persister 102 on the first node 104 has been transferred to the cloned persister 110. The system 100 may create any number of cloned persisters 110 and/or persistent data files 114, 116.

Figure 3I:
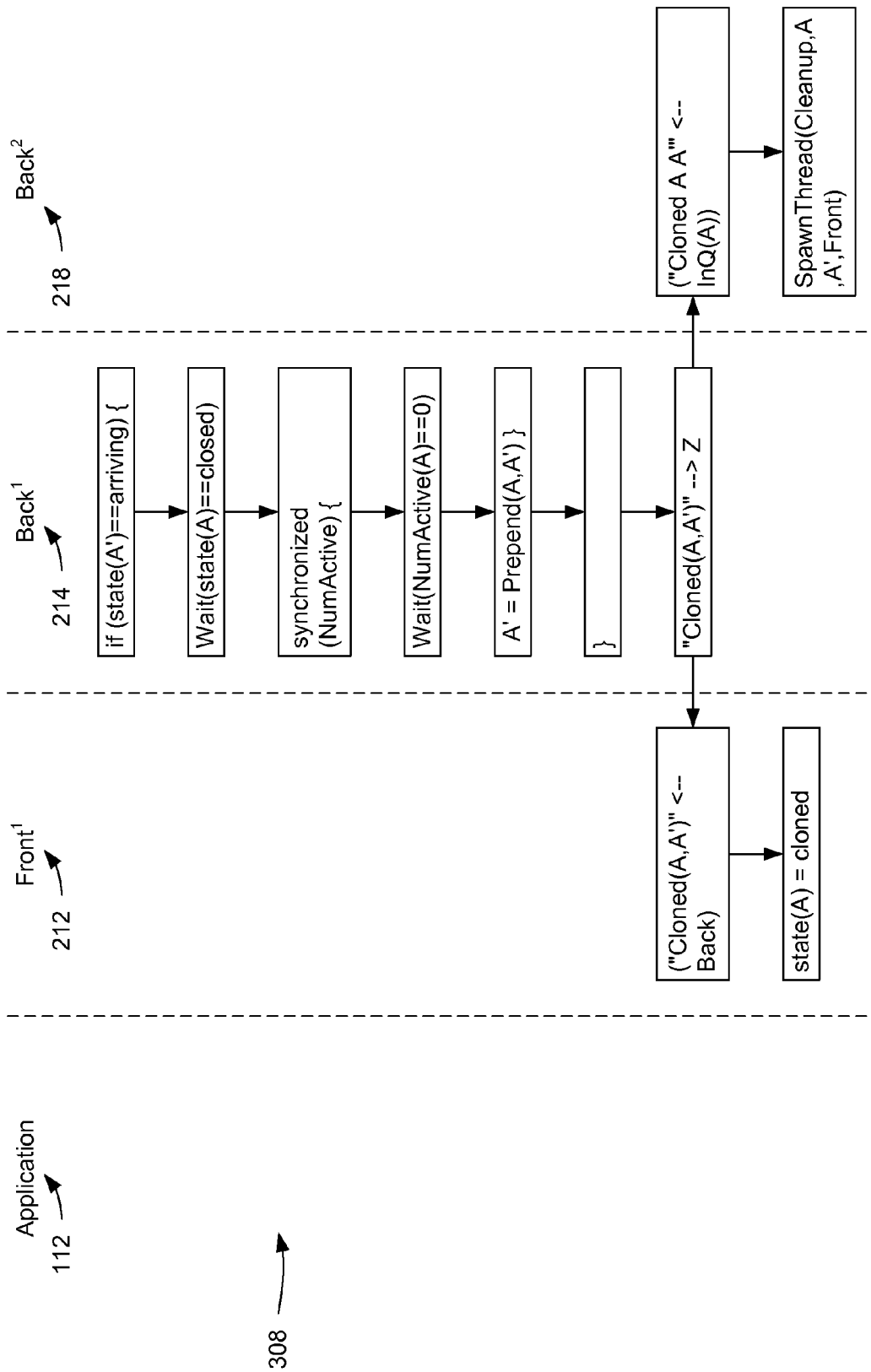
Figure 3K:
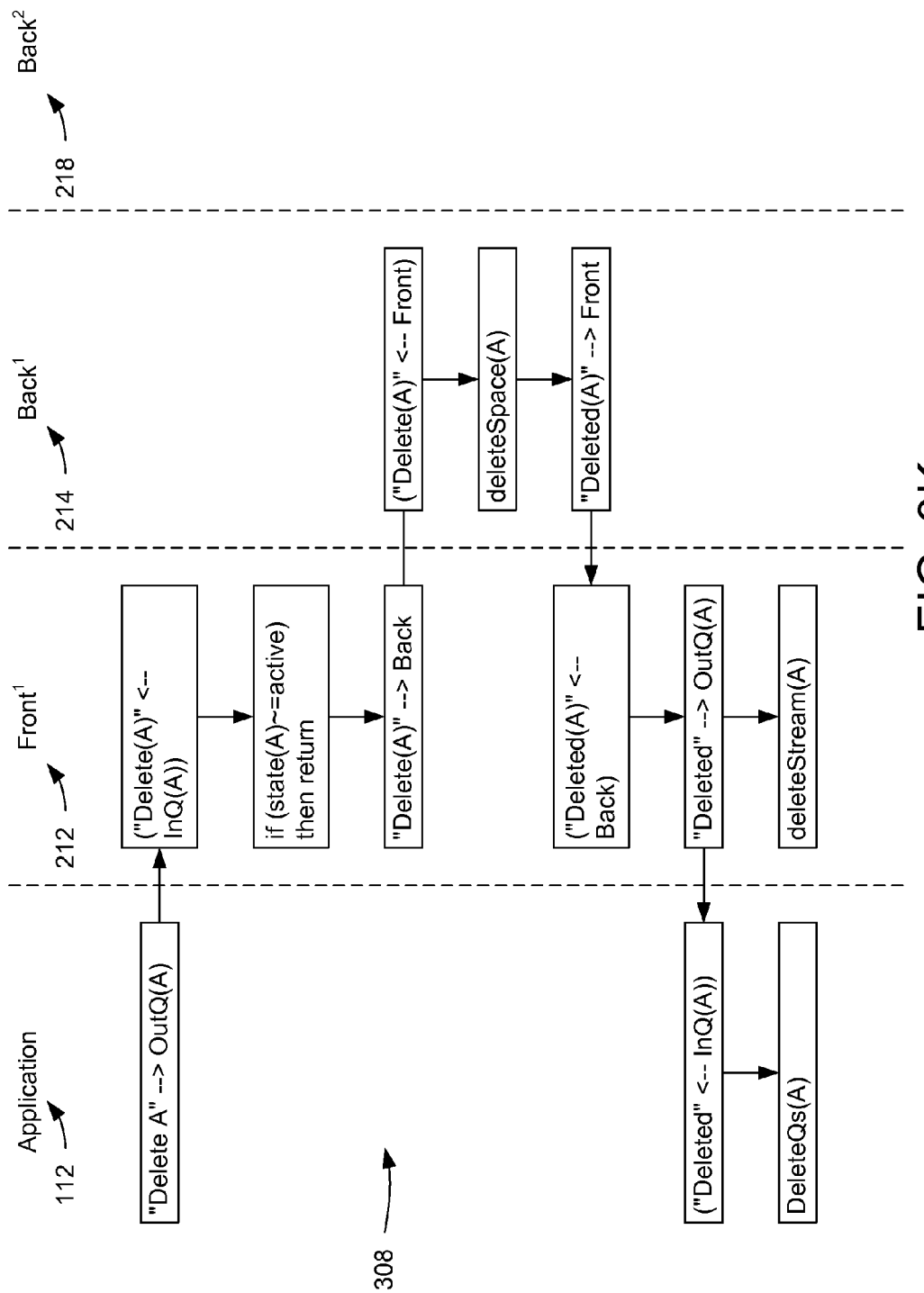

FIGS. 3I-3K illustrate flow charts 308 for finishing the cloning process after the persistent data file 114 and persister 102 on the first node 104 are cloned on the second node 106. When all the data has been transferred from the persister 102 to the cloned persister 110 such that both persistent data files 114, 116 contain identical data (except for data in transit from the persistent data file 116 at the second node 106 to the persistent data file 114 at the first node 104), the persistent data files 114, 116 on the first node 104 may be removed and extra persistent data files 114 on the second node 106 may also be removed. The system 100 may remove any data streams 118 between the persister 102 and cloned persister 110, as well as any data streams 118 from the application 112 to the persister 102 on the first node 104, and the connections between components or modules that are no longer transferring data may be terminated. In some embodiments, the application 112 may retrieve data from either the persister 102 or the cloned persister 110 until one of the persisters is removed. This may be useful in case of failure in one of the persisters.

An embodiment of a persister cloning system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to move data stored on a transactional semantic independent persister in a distributed environment. The system receives an indicator to move data stored on a persister at a first node of the distributed environment to a second node. In one embodiment, the persister clones itself on the second node when an application corresponding to a persistent data file on the first node moves from the first node to the second node. In a further embodiment, the cloning process includes moving data stored by the persister at the first node to the cloned persister, and moving any remaining data in a data stream between the application and the persister to the cloned persister.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. A computer readable storage medium is a specific type of computer-readable or -usable medium. Examples of a computer-readable medium include a semiconductor or solid state memory, magnetic tape, a removable computer diskette, a random access memory (RAM), a read-only memory (ROM), a rigid magnetic disk, and an optical disk. Hardware implementations including computer readable storage media also may or may not include transitory media. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
 a non-transitory computer readable storage medium to store a computer readable program, wherein the computer readable program, when executed by a processor within a computer, causes the computer to perform operations for moving data stored on a persister in a distributed environment, the operations comprising:
 receiving an indicator that an application in communication with a persister has moved from a first node of the distributed environment to a second node of the distributed environment, and cloning the persister at the first node to a cloned persister at the second node in response to receiving the indicator, wherein the cloning comprises:

moving data stored by the persister at the first node to the cloned persister, the data corresponding to the application: and moving remaining data in a data stream between the application and the persister at the first node to the cloned persister.

2. The computer program product of claim 1, wherein the computer program product, when executed on the computer, causes the computer to perform additional operations, comprising:

receiving a signal from the application to stop the persister at the first node from persisting data from the application after cloning the persister;

removing the data stream between the persister at the first node and the application: and terminating a connection between the application and the persister at the first node.

3. The computer program product of claim 2, wherein the computer program product, when executed on the computer, causes the computer to perform additional operations, comprising:

deleting the persister at the first node after terminating the connection.

4. The computer program product of claim 1, wherein cloning the persister further comprises:

maintaining two persistent data files at each node that store data received from one of the persister or the cloned persister, wherein each persistent data file at the first node is paired with a corresponding persistent data file at the second node;

streaming data in both directions between the first and second nodes until each persistent data file is identical to the corresponding persistent data file; and preserving a data transmission order at each node, wherein the data transmission order specifies an order that data is sent to either the persister or the cloned persister from the application.

5. The computer program product of claim 1, wherein the persister comprises a front end and a back end, wherein the front end communicates with the application and the back end communicates with a back end of the cloned persister.

6. The computer program product of claim 1, wherein cloning the persister further comprises:

compressing and encrypting the data at the persister before moving the data to the cloned persister.

7. A method for moving data stored on a persister in a distributed environment, comprising:

receiving an indicator that an application in communication with a persister has moved from a first node of the distributed environment to a second node of the distributed environment; and cloning the persister at the first node to a cloned persister at the second node in response to receiving the indicator, wherein the cloning comprises:

moving data stored by the persister at the first node to the cloned persister: the data corresponding to the application; and moving remaining data in a data stream between the application and the persister at the first node to the cloned persister.

8. The method of claim 7, further comprising:

receiving a signal from the application to stop the persister at the first node from persisting data from the application after cloning the persister;

removing the data stream between the persister at the first node and the application: and terminating a connection between the application and the persister at the first node.

9. The method of claim 8, further comprising:

deleting the persister at the first node after terminating the connection.

10. The method of claim 7, wherein cloning the persister further comprises:

maintaining two persistent data files at each node that store data received from one of the persister or cloned persister, wherein each persistent data file at the first node is paired with a corresponding persistent data file at the second node;

streaming data in both directions between the first and second nodes until each persistent data file is identical to the corresponding persistent data file; and preserving a data transmission order at each node, wherein the data transmission order specifies an order that data is sent to either the persister or the cloned persister from the application.

11. The method of claim 7, wherein the persister comprises a front end and a back end, wherein the front end communicates with the application and the back end communicates with a back end of the cloned persister.

12. The method of claim 7, wherein cloning the persister further comprises:

compressing and encrypting the data at the persister before moving the data to the cloned persister.

13. A transactional independent persister cloning system, comprising:

a self-cloning data persister on a first node of a distributed environment; and a receiver to receive, via a processor, an indicator that an application in communication with the self-cloning data persister has moved from the first node to a second node of the distributed environment;

wherein the self-cloning data persister is configured to self-clone to a cloned persister at the second node in response to the receiver receiving the indicator, wherein the self-cloning data persister is further configured to clone data corresponding to the application by:

moving data stored on the self-cloning data persister at the first node to the cloned persister; and moving remaining data in a data stream between the application and the self-cloning data persister at the first node to the cloned persister.

14. The system of claim 13, wherein the self-cloning data persister is further configured to:

compress and encrypt the data at the self-cloning data persister before moving the data to the cloned persister.

15. The system of claim 14, wherein the receiver is further configured to receive a signal from the application to stop the self-cloning data persister at the first node from persisting data from the application after the self-cloning data persister is cloned, wherein the self-cloning data persister is further configured to remove the data stream between the self-cloning data persister at the first node and the application, and to terminate a connection between the application and the self-cloning data persister at the first node.

16. The system of claim 15, wherein the self-cloning data persister is further configured to remove itself from the first node after terminating the connection.

17. The system of claim 13, wherein the self-cloning data persister is further configured to:
- maintain two persistent data files at each node that store data received from one of the self-cloning data persister or cloned persister, wherein each persistent data file at the first node is paired with a corresponding persistent data file at the second node;
- stream data in both directions between the first and second nodes until each persistent data file is identical to the corresponding persistent data file; and
- preserve a data transmission order at each node, wherein the data transmission order specifies an order that data is sent to either the self-cloning data persister or the cloned persister from the application.

18. The system of claim 13, wherein the self-cloning data persister comprises a front end and a back end, wherein the front end communicates with the application and the back end communicates with a back end of the cloned persister.

\* \* \* \* \*